(12) United States Patent
Karame et al.

(10) Patent No.: US 11,036,395 B2
(45) Date of Patent: Jun. 15, 2021

(54) SECURE AND TRANSPARENT PRUNING FOR BLOCKCHAINS

(71) Applicant: NEC Laboratories Europe GmbH, Heidelberg (DE)

(72) Inventors: Ghassan Karame, Heidelberg (DE); Alessandro Sforzin, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 163 days.

(21) Appl. No.: 16/245,268

(22) Filed: Jan. 11, 2019

(65) Prior Publication Data

US 2020/0125269 A1 Apr. 23, 2020

Related U.S. Application Data

(60) Provisional application No. 62/747,145, filed on Oct. 18, 2018.

(51) Int. Cl.
*G06F 16/00* (2019.01)
*G06F 3/06* (2006.01)
(Continued)

(52) U.S. Cl.
CPC ............ *G06F 3/0608* (2013.01); *G06F 3/067* (2013.01); *G06F 3/0641* (2013.01); *G06F 3/0652* (2013.01); *G06F 16/1824* (2019.01); *G06Q 20/382* (2013.01); *H04L 9/0643* (2013.01); *H04L 9/3236* (2013.01); *H04L 2209/38* (2013.01)

(58) Field of Classification Search
CPC ........... H04L 2209/38; H04L 2209/603; G06F 16/2246; G06F 16/137; G06F 3/0608; G06F 3/0652; G06F 16/2255; G06F 16/9027; G06F 16/1865; G06F 21/40
See application file for complete search history.

(56) References Cited

U.S. PATENT DOCUMENTS

2016/0330034 A1* 11/2016 Back .................... G06Q 20/065
2017/0337534 A1* 11/2017 Goeringer ............ G06Q 50/188
(Continued)

OTHER PUBLICATIONS

Alexey Eromenko: Masterblocks: Scaling Blockchain by summarizing balances for Dash and Bitcoin Cash [Research Paper Draft], Feb. 7, 2018 (Feb. 7, 2018), XP055608788.
(Continued)

*Primary Examiner* — Dinku W Gebresenbet
(74) *Attorney, Agent, or Firm* — Leydig, Voit & Mayer, Ltd.

(57) ABSTRACT

A method for pruning a blockchain of a blockchain network includes creating an active blocks commitments Merkle tree from hashes of active blocks and creating an active smart contracts commitments Merkle tree from hashes of active smart contracts. The Merkle trees are created after an amount of blocks created in the blockchain has reached a threshold set by a pruning threshold parameter stored in the blockchain network. Hashes of the roots of the Merkle trees are stored in a header of a new block as a new genesis block. The new genesis block is broadcast to the blockchain network. A local copy of the blockchain is pruned at a pruning point in accordance with the pruning threshold parameter based on the blockchain network having reached consensus on the new genesis block.

15 Claims, 3 Drawing Sheets

(51) Int. Cl.
*H04L 9/32* (2006.01)
*H04L 9/06* (2006.01)
*G06Q 20/38* (2012.01)
*G06F 16/182* (2019.01)

(56) References Cited

U.S. PATENT DOCUMENTS

2018/0152289 A1* 5/2018 Hunt .................... G06Q 20/223
2018/0189312 A1* 7/2018 Alas .......................... G06F 21/64
2019/0044734 A1* 2/2019 Lancashire ........ G06Q 20/3825

OTHER PUBLICATIONS

Ross Nicoll: "Blockchain regenesis. Issue #1185. Dogecoin/dogecoin. Github", Jun. 25, 2015 (Jun. 25, 2015), XP055608803.
Satoshi Nakamoto, "Bitcoin: A Peer-to-Peer Electronic Cash System", ResearchGate, Mar. 2009, pp. 1-9.
Bitcoin Core version 0.11.0 release notes, Aug. 5, 2015, pp. 1-10.
Bitcoin Core version 0.12.0 release notes, Jul. 8, 2016, pp. 1-16.
"Thin Client Security", Bitcoin Wiki, May 22, 2018, pp. 1-5.
Ethan Heilman, et al., "Eclipse Attacks on Bitcoin's Peer-to-Peer Network", Proceedings of the 24th USENIX Security Symposium, Aug. 12-14, 2015, pp. 1-17.
"Data Security", Bitcoin Wiki, Nov. 19, 2017, pp. 1-5.

* cited by examiner

SECURE AND TRANSPARENT PRUNING FOR BLOCKCHAINS

CROSS-REFERENCE TO PRIOR APPLICATIONS

Priority is claimed to U.S. Provisional Application No. 62/747,145 filed on Oct. 18, 2018, the entire contents of which is hereby incorporated by reference herein.

FIELD

The present invention relates to blockchains and blockchain networks and, in particular, to pruning of blockchains in blockchain networks.

BACKGROUND

Nowadays, one of the biggest deterrents to a widespread use of the blockchain is the sheer amount of disk space needed to maintain a blockchain node. Currently, the Bitcoin blockchain needs about 200 GB of space to store its blocks and transactions. On the one hand, all this available historical data helps with issues of transparency and double-spending; on the other hand, it makes it unfeasible for less powerful devices to take part in the blockchain consensus.

Since version 0.11.0, discussed in the Bitcoin Core version 0.11.0 Release Notes, the Bitcoin client has introduced the possibility to prune the blockchain. Pruning allows the Bitcoin client to delete raw blocks and undo data once it's been validated and used to build the databases needed for a node to follow the protocol. The pruning is done locally, so each node can choose how many blocks it wants to prune (but each node must keep at least two days' worth of blocks to keep running correctly).

However, taking advantage of pruning disables some functionalities of the Bitcoin client, such as block relaying and the ability to maintain a full transaction index. A later version 0.12.0 of the Bitcoin client discussed in the Bitcoin Core version 0.12.0 Release Notes introduced the possibility of relaying only new blocks, that is, blocks that extend the client's active chain.

The use of light clients has been proposed since the introduction of Bitcoin in Nakamoto, Satoshi, "Bitcoin: A peer-to-peer electronic cash system," (2008). Light clients connect to regular blockchain nodes, and request from them only the blockchain blocks' headers and only those transactions that are of interest to the light client itself, that is, those in which it is either a sender or a receiver. With this approach, with a block header being 80 bytes and with a rate of 1 block every 10 minutes, the size of the blockchain increases about 4.2 MB per year. This is a much more viable solution for resource-constrained devices than downloading the entire blockchain data.

However, the solutions for light clients have drawbacks. First of all, the light clients cannot validate the transactions themselves, because they do not store the blockchain's transaction history needed to check for double-spending. The only method the light clients have for asserting the validity of a transaction is the "X blocks deep" method. This method takes X to be the number of blocks added after the one containing the given transaction, then the light client essentially has to trust that the given transaction, X blocks deep, would have been too costly to forge for an attacker.

In comparison, full nodes, also referred to as thick clients, can validate transactions by checking the whole blockchain up to that point. The full nodes use the "X blocks deep" method as well, but for a different purpose: to decide how likely it is that a longer fork in the blockchain will emerge which excludes that transaction.

Last but not least, light clients have to trust the node(s) to which they connect and request the blockchain data. Since the light clients do not store the entire blockchain, they lack the means to verify the honesty of the node(s) to which they are connecting to. The light clients could only obtain some guarantees by connecting to multiple nodes, downloading data from each of them, and looking for suspicious differences between the obtained data. Even so, as shown in Heilman, Ethan, et al., "Eclipse Attacks on Bitcoin's Peer-to-Peer Network," USENIX Security Symposium (2015), the light clients have been found vulnerable to Eclipse attacks, which are attacks in which a malicious blockchain node is able to completely isolate another node from the blockchain and feed it false blockchain data.

SUMMARY

In an embodiment, the present invention provides a method for pruning a blockchain of a blockchain network. The method includes creating an active blocks commitments Merkle tree from hashes of active blocks and creating an active smart contracts commitments Merkle tree from hashes of active smart contracts. The Merkle trees are created after an amount of blocks created in the blockchain has reached a threshold set by a pruning threshold parameter stored in the blockchain network. Hashes of the roots of the Merkle trees are stored in a header of a new block as a new genesis block. The new genesis block is broadcast to the blockchain network. A local copy of the blockchain is pruned at a pruning point in accordance with the pruning threshold parameter based on the blockchain network having reached consensus on the new genesis block.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
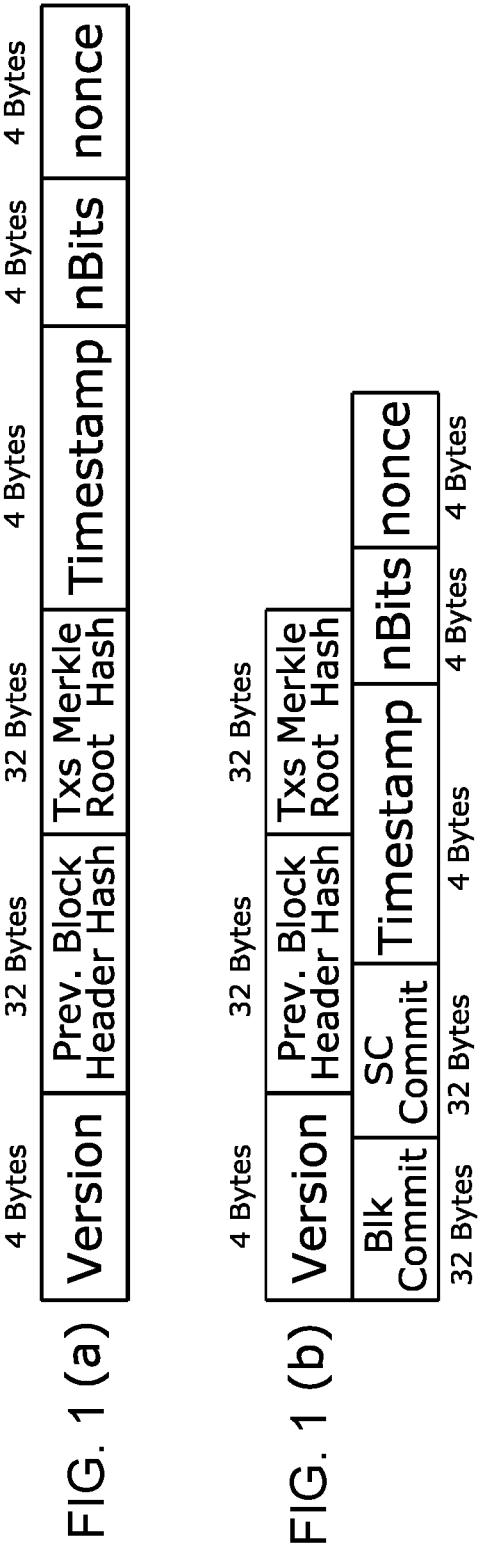
FIG. 1(a) is an example of a block header before introducing root hashes of active blocks and active smart contracts commitments Merkle trees.
FIG. 1(b) is an example of a block header before introducing root hashes of active blocks and active smart contracts commitments Merkle trees.

An embodiment of the present invention provides a method that improves blockchain pruning functionalities. As used herein, "pruning" does not require that any part of the blockchain be deleted. Rather, according to a preferred embodiment, the blocks located prior to a pruning point are not deleted, but rather compressed to advantageously maintain a full copy of the blockchain, but reduce its memory requirements. This method can be especially advantageously applied according to an embodiment for improving the Bitcoin blockchain. It allows to efficiently prune the blockchain by creating a block that will become a new genesis block, and whose ancestor blocks will be compressed. The pruning will force nodes to commit to the current unspent transaction output (UTXO) or active blocks set, that is, to consider it as the "truth." The active blocks are the blocks that have at least one transaction with one UTXO. By having all nodes in the network prune from the same block, the old blocks and transactions can be discarded because they are considered universally valid and are not needed anymore to validate new transactions.

A blockchain network is typically composed nodes which are computer devices in the blockchain network that can assume the role of either regular clients or miners. Clients send and receive transactions, and contribute to the blockchain by relaying to their neighbors every transaction and block that they receive. Miners are clients than can validate transactions and aggregate them into blocks and broadcast them into the blockchain network so that every node can update its local copy of the blockchain stored in a memory device.

Regardless of the role covered, each network node has to store a local copy of the entire blockchain in order to validate new transactions and blocks, and detect double-spending. The redundancy also helps against denial of service attacks.

According to an embodiment, the present invention provides a method to prune the blockchain at regular intervals. An adjustable counter keeps track of how many blocks were created since the last pruning event and, when a previously set threshold is surpassed, indicates when to prune the blockchain. The value of the counter also represents how many blocks to keep after each pruning cycle.

The pruning process starts after a miner successfully generates the following: (i) an active blocks commitment Merkle tree, (ii) an active smart contracts Merkle tree, and (iii) a new block as usual. This new block is a regular block with the addition of the active blocks commitment Merkle tree and the active smart contracts commitment Merkle tree. Additionally, the header of the new block includes the root hashes of each of those two Merkle trees. The new block is then sent into the network, where it will be spread via a gossip protocol.

Once the network accepts the new block as the genesis block, that is, miners start building the blockchain on top of it, all nodes can prune their local copy of the blockchain by either compressing the blocks with a modern compression algorithm, or by applying a block-based or Rabin-based deduplication algorithm. Another viable strategy would be moving the pruned blocks to slower, but less expensive, storage facilities such as cloud storage or external universal serial bus (USB) drives. While it could also be deleted, this would result in the history not being retrievable.

By creating a new common starting point at the new genesis block, and committing to the current active blocks set, the network agrees that all transactions before the pruning point are to be considered valid and unalterable. Advantageously, this emulates a hard checkpoint that cannot later be forked. Therefore, the transactions before the pruning point are not needed anymore for the validation of past transactions and can be pruned to save disk space.

If the need arises to retrieve an older transaction belonging to a set of already pruned blocks, it could be retrieved by uncompressing the relevant block.

Every node in a blockchain is a client, with some of them additionally assuming the role of miners. Functions attributed to regular clients include:

Full read access to the blockchain's ledger.

Sending and receiving transactions.

Relaying transactions and blocks to neighboring nodes as part of the gossip protocol.

Additionally, ordinary clients store a local copy of the entire blockchain which, as mention above, typically amounts to hundreds of gigabytes of disk space.

Miners are clients that carry out additional tasks directed at extending and maintaining the blockchain. Miners also need to store a local copy of the entire blockchain. Their set of functionalities includes those of regular clients, with the following additions:

1) Validation of transactions.
2) Validation of blocks.
3) Creation of new blocks by grouping a number of transactions.

The process of creating a new block requires the miner to solve a Proof-of-Work (PoW) which is a very hard computational puzzle Block creation is designed to be a computational-resource-demanding operation to prevent malicious network peers from attempting to modify past blocks. In practice, the cost of modifying a block increases with every new block added to the blockchain.

Light clients are an option for those unwilling to either invest in a powerful machine to assume a miner role or store the entire blockchain on disk. As stated above, light clients are only interested in storing a subset of the blockchain's data. In particular, the light clients request only transactions that interest them directly. This allows them to join the network without the burden of storing hundreds of gigabytes of data.

As previously mentioned, blockchain nodes have to store a significant amount of data. For example, Bitcoin blockchain nodes create a folder which stores all related files. Embodiments of the present invention focus on the files storing blocks and transaction data. These files are the cause of the blockchain's high disk size requirements. Embodiments of the present invention apply the pruning to these files.

Using Merkle tree commitments according to embodiments of the present invention advantageously speeds up the transaction validation process. In particular, according to embodiments of the present invention, the active blocks and smart contracts are in respective Merkle trees whose root hashes are added to the block header of the new genesis block. This allows for pruning of blocks which, in turn, saves disk space and allows the nodes to validate the transactions faster by having less overall transaction data to consider.

FIG. 1(a) shows a block header before introducing the Merkle Tree commitments. FIG. 1(b) shows a block header after introducing the Merkle tree commitments. Blk commit is the root hash of the active blocks commitment Merkle tree and SC commit is the root hash of the smart contracts commitment Merkle tree.

Merkle trees are binary trees of hashes. The tree is built by pairing and hashing its leaves, and then hashing the results until a single hash remains: the tree's root. If there are an odd number of leaves, then the leaf without an assigned companion is hashed with a copy of itself. The root value is what will be added to the blocks' headers.

Figure 2:
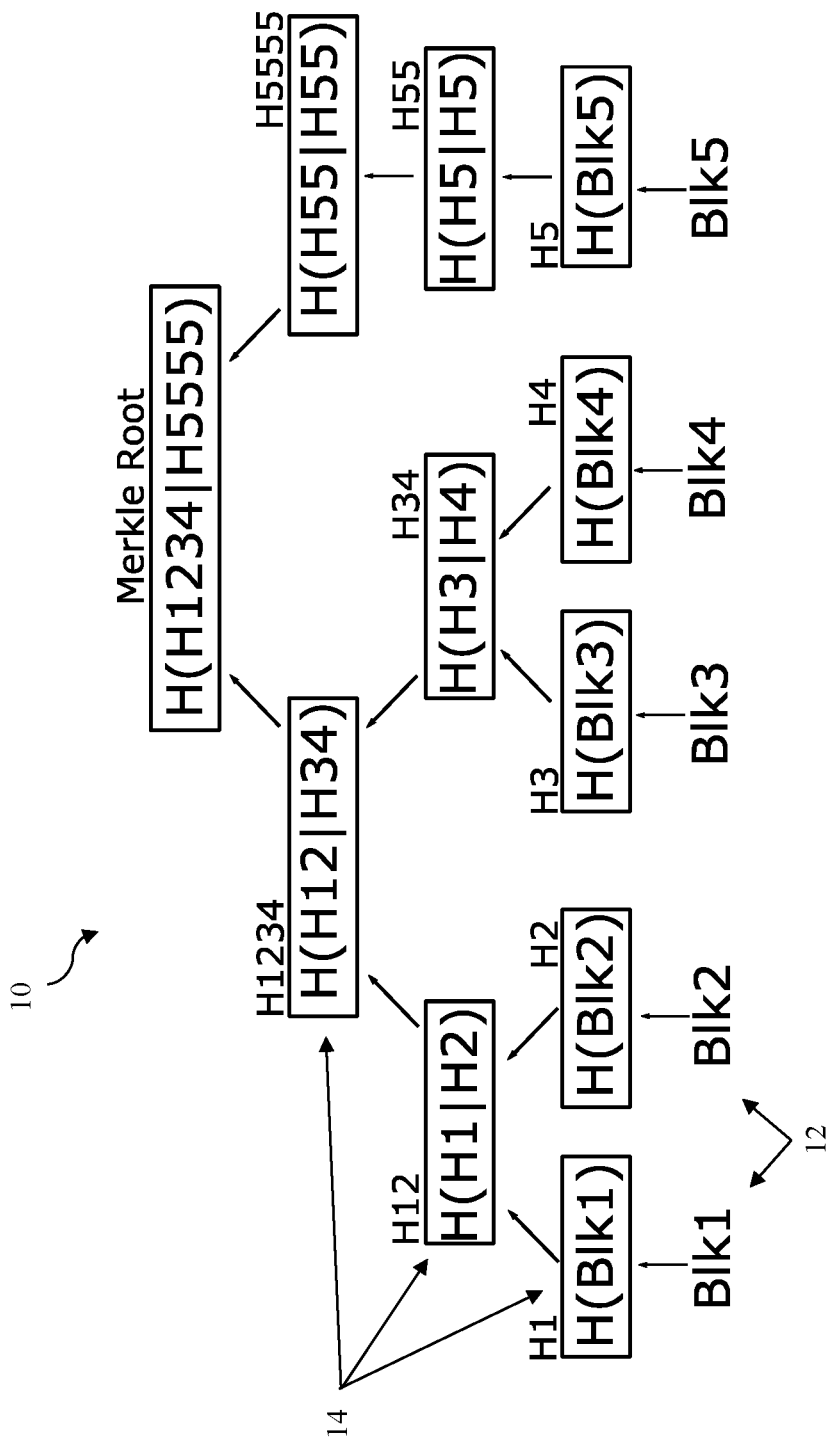
FIG. 2 is an example of a Merkle tree created for five blocks.

FIG. 2 shows an example of how a s Merkle tree 10 comprising five blocks 12 indicated as Blk1, Blk2, Blk3, Blk4 and Blk5 each containing transaction data would be built. The tree's leaves 14 are hashes of the blocks 12 indicated in FIG. 12 by the letter H followed by the blocks which are hashed (e.g., H1 is the hash of block 1, H12 is the combination of the hashes of blocks 1 and 2, H1234 is the combination of the hashes of blocks 1-4, H55 is the combination of the hash of block 5 with itself, and so on). The hashes of the leaves 14 are then paired and hashed toward the root 16 of the Merkle tree 10 until the root 16 remains. In the example of FIG. 2, the block 12 indicated as Blk5 is hashed with a copy of itself since it does not have a companion.

One main benefit of Merkle trees is that transaction validation would now require only log(N), where N is the amount of leaves 14 of the Merkle Tree 10. Commitments simplify the attestation of the validity of any leaf 14 in the Merkle tree with a Merkle proof, thus proving that a selected block containing transaction data is indeed valid. Specifically, to validate a transaction, only the Merkle root 16 and a list of the intermediate hashes are needed. For example, to validate a transaction in the block 12 indicated as Blk3 of FIG. 2, a node only needs a copy of the H4, H34, and H1234 hashes in addition to the Merkle root 16.

Light clients can also benefit from blocks commitments, because it would allow them to immediately synchronize with the blockchain with just a Merkle root hash (the active blocks commitment Merkle tree root hash).

Embodiments of the present invention leverage a combination of Merkle tree commitments and pruning to mitigate the impact of the blockchain's size on disk, thereby freeing up disk space and computational resources, and providing for faster computation by the blockchain nodes in validating transactions.

First, according to an embodiment of the present invention, a new network-wide parameter is introduced and referred to herein as "a pruning threshold" with a double meaning:

1) The amount of blocks to keep after pruning the local copy of the blockchain.

2) The minimum amount of blocks between two consecutive pruning events.

The pruning threshold can therefore be a single parameter or both. The pruning parameter can be applied in a manner similar to the difficulty parameter in modern blockchains such as Bitcoin and Ethereum, and will be integrated in the core algorithm so that every node is aware of its value. The initial value can be adjusted according to a desired target maximum size of the blockchain on disk.

A separate counter keeps track of the number of blocks created from the previous pruning event. Once it becomes greater or equal then the pruning threshold, a new pruning event starts. The counter is reset after each pruning cycle.

Since the pruning threshold value is known to all nodes, once the number of blocks created passes the threshold, as determined by the counter, the miners know that the next block that they create could be a new genesis block. The new genesis block resembles a regular block with two additions:

1) The body of the new genesis block contains the active blocks commitment Merkle tree and the active smart contracts commitment Merkle tree. This is achieved by the miner storing the hashes of the headers of the current set of active blocks and hashes of the code of the current set of active smart contracts in respective Merkle trees and adding the Merkle trees in the body of the new genesis block, together with the hashes of the transactions in the usual Merkle tree for the transactions normally present in all blocks. The active smart contracts are the smart contracts which have been recently invoked. These smart contracts are stored in the bodies of invoked transactions. This provides a commitment over all contracts to allow for the pruning of the blockchain.

2) The header of the new genesis block contains the hashes of the roots of the active blocks commitment Merkle tree and the active smart contracts commitment Merkle tree root hash (see Blk commit and SC commit, respectively, in FIG. 1(*b*)).

The first miner that is able to solve the PoW computational puzzle then broadcasts the new genesis block into the network, where it is spread, e.g., by the gossip protocol.

At this stage, there are two possible outcomes:

1) The network "rejects" the new genesis block by the nodes not reaching consensus on the new genesis block. This will occur where the other nodes have a different value for any of the hashes of the Merkle trees. In this case, the other miners do not build on top of the new genesis block, that is, they do not append their newly generated blocks after it. Since this signals that they do not agree with pruning the blockchain at this point in time, they will keep building the old unpruned blockchain until the counter reaches the pruning threshold again.

2) The network "accepts" the new genesis block by the nodes reaching consensus on the new genesis block, or in other words having the same values for the hashes of the Merkle trees. In this case, the other miners will build on top of the new genesis block, that is, they will append their newly generated blocks after it. This signals that they agree with pruning the blockchain at this point in time, and will therefore prune their local copy accordingly.

If the new genesis block is accepted, non-miner nodes will switch to the new blockchain, and will in turn prune their local copy.

Thus, if the new genesis block is accepted, then all nodes are able to safely prune their local copy of the blockchain. The pruning procedure works as follows:

1) The pruning threshold parameter defines how many blocks to keep in the local copy after pruning.

2) Each node can make a decision about how to act on its blockchain local copy. They can compress the data of the blocks which can be pruned according to the pruning threshold parameter using a modern compression algorithm, such as GZIP, or apply deduplication techniques such as block-based or Rabin-based deduplication. In both cases, pruning affects the files on disk that store data about the blockchain's blocks. Nodes can also decide not to prune the blockchain at all, thus keeping their blockchain local copy intact. It is possible, according to an embodiment, to enforce pruning on the nodes.

3) If a node decides to prune its blockchain local copy then, regardless of the processing method of choice, it will apply the pruning up to the block defined by the pruning threshold.

By pruning the blockchain and committing to the current set of active blocks and smart contracts, the nodes are fully accepting everything that happened before the pruning point as an unchangeable truth. Specifically, the nodes acknowledge that it would be too computationally costly for an attacker to attempt to change that history, and therefore the blocks not required to be saved by the pruning threshold parameter can be pruned to save disk space.

Embodiments of the present invention provide for the following improvements and advantages:

1) Combining network consensus and blockchain pruning to allow to save disk space. In particular, nodes can reach consensus over accepting or rejecting pruning at different points in time. When consensus is reached over accepting the pruning, the nodes start building the blockchain on the newly broadcasted genesis block. This emulates a network-wide parameter to give all nodes an indication on when to start the blockchain pruning process.

2) Achieving pruning by deduplicating or compressing blockchain contents, or by moving the contents to slower, but less expensive memory devices.

3) Enforcing the pruning of the blockchain on a network-wide scale at the same point, in contrast to allowing each node to prune their local blockchain copy independently at different points.

4) Making the blockchain pruning process uniform. All nodes will prune their blockchain local copy for the same amount of data, in contrast with the current method of allowing each node to choose how much to prune their local blockchain copy, possibly creating inconsistencies.

5) Faster transactions and blocks look-up as the pruning process decreases the amount of data to search through.

According to an embodiment of the present invention, a method for performing secure and transparent pruning of a blockchain comprises the steps of:

1) It is determined that the number of blocks created becomes greater than or equal to the pruning threshold parameter indicating the network's threshold for pruning.

2) Miners create the active blocks and active smart contracts commitments Merkle trees and store the hashes of their roots in the new genesis block that they create. A miner is able to create the new genesis block before the other miners and broadcasts it into the network.

3) The network reaches consensus over the new block: miners can either accept the pruning and keep building the blockchain on top of the new genesis block, or ignore it and keep building the old unpruned blockchain.

4) If miners ignore the new genesis block, then the process will restart at step 1) at the next cycle.

5) If the new genesis block is accepted, one or more nodes in the network prunes its local copy of the blockchain and commits to the current sets of active blocks and smart contracts. Nodes can decide not to prune their local copy of the blockchain, but they have to switch to the new genesis block once it is accepted. The new genesis block replaces the old genesis block and the nodes use the new blockchain with the new genesis block.

6) Miners keep building the blockchain by appending blocks on top of the newly created genesis block.

While pruning can be done locally and without synchronization, the network would risk losing content without consensus in this case.

Figure 3:
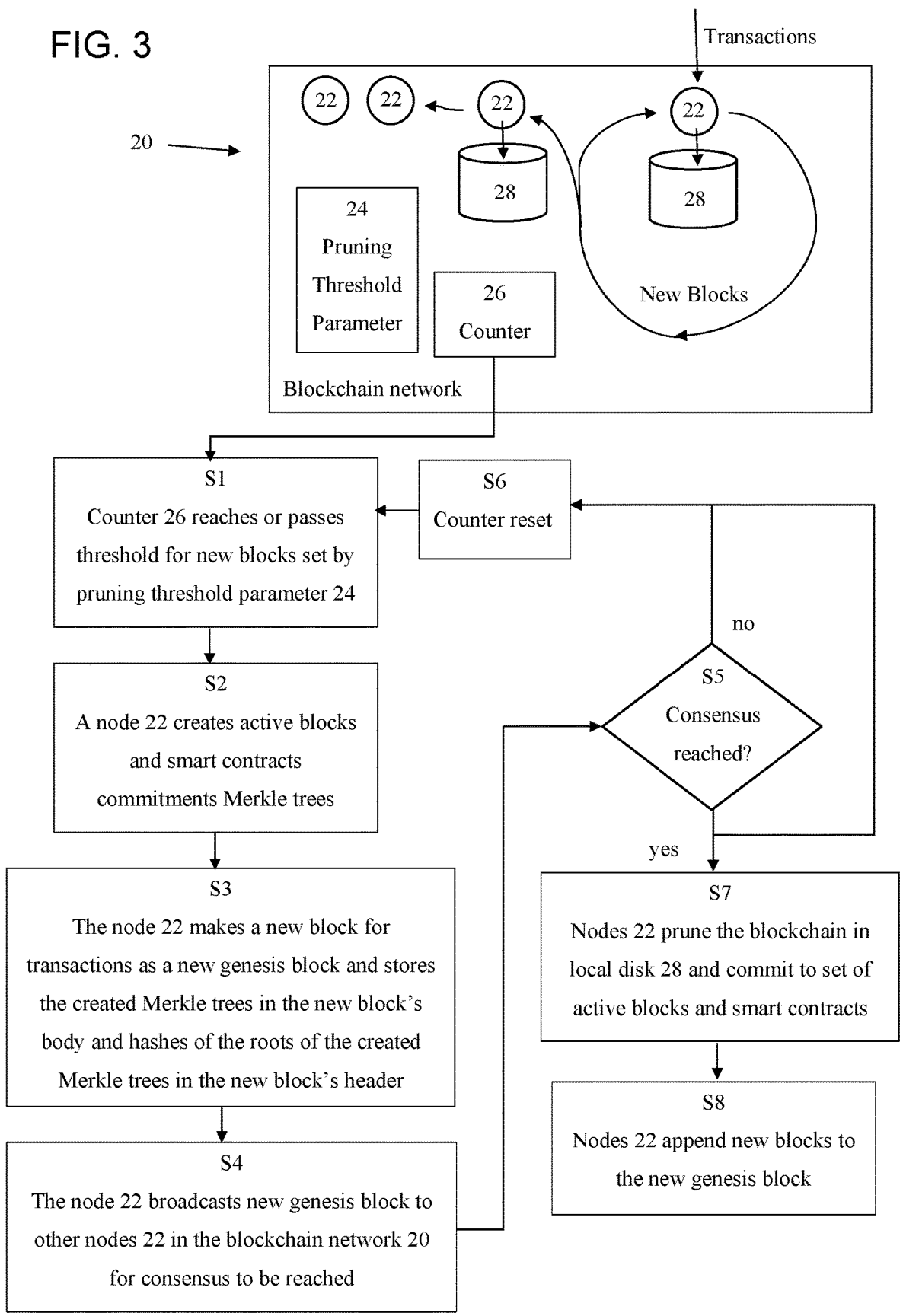
FIG. 3 is a schematic overview of the method for pruning of a blockchain in accordance with an embodiment of the present invention.

FIG. 3 schematically illustrates transactions coming into the blockchain network 20, in which the nodes 22 are located and are able to communicate with each other, for example using the gossip protocol, to share information and reach consensus on new blocks. Each of the nodes 22 is a computer device for performing functions in the blockchain with its own local copy of the blockchain. Nodes 22 who are miner nodes are able to validate the transactions coming into the blockchain network 20 and create new blocks which are added to the blockchain. Specifically, the miner nodes create new blocks from the transaction data and broadcast the new blocks to the other nodes 22 in the blockchain network for reaching consensus on the new blocks. If consensus is reached, the transactions are considered valid and the new blocks are appended to the blockchain. Embodiments of the present invention implement the pruning threshold parameter 24 and a counter 24 for the number of blocks being added to the blockchain within the blockchain network 20.

According to a first step S1, the counter 24 reaches a threshold set by the pruning threshold parameter 26 which is implemented in the blockchain network 20 such that the nodes 22 are each aware when the threshold has been reached. At this point, or thereafter, in a second step S2 one of the nodes 22 who is a miner node creates Merkle trees using hashes of the current set of active blocks and current set of active smart contracts, respectively. In a third step S3, the node 22 which created the Merkle trees creates a new block for transactions, as it would ordinarily do. However, this new block is created as a new genesis block and differs from an ordinary block as the node 22 in that the node 22 adds the root hashes of the Merkle tree to its header and also preferably stores the created Merkle trees together with the ordinary Merkle tree for transactions in its body. After creating the new genesis block, the node 22 broadcasts it into the blockchain network in a fourth step S4 so that consensus can be reached on it in a fifth step S5. Regardless of whether consensus is reached, the counter will be reset in a sixth step S6, which could also be performed at other times, such as upon reaching the threshold. If consensus is not reached in step S5, then the new genesis block is not accepted and the method repeats from step S1. On the other hand, if consensus is reached, the new genesis block is accepted, which means that the nodes 22 are safe to prune the local copies of their blockchains stored in their local disks 28 in a step S7. By reaching consensus on the same genesis block and setting an amount of blocks to prune through the pruning threshold parameter, it is advantageously provided that 1) each of the nodes 22 can prune their local copy of the blockchains at the same pruning point such that all copies of the blockchain stored in the blockchain network 20 are the same; and 2) each of the nodes 22, regardless of a decision to prune or not, will be committed to the same set of active blocks and smart contracts at the same time. At that point, new blocks for are appended to the new genesis block in a eighth step S8 as further transactions are validated and new blocks are created for the transactions. New blocks continue to be added until the threshold is reached again, at which point processing returns to the first step S1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for pruning a blockchain of a blockchain network, the method comprising:
creating an active blocks commitments Merkle tree from hashes of active blocks and creating an active smart contracts commitments Merkle tree from hashes of active smart contracts, the Merkle trees being created after an amount of blocks created in the blockchain has reached a threshold set by a pruning threshold parameter stored in the blockchain network;
storing hashes of the roots of the Merkle trees in a header of a new block as a new genesis block;
broadcasting the new genesis block to the blockchain network; and
pruning a local copy of the blockchain at a pruning point in accordance with the pruning threshold parameter based on the blockchain network having reached consensus on the new genesis block.

2. The method according to claim 1, wherein the local copy of the blockchain is stored in a local disk space of a node of the blockchain network, and wherein the pruning the local copy of the blockchain comprises compressing blocks of the blockchain stored in the local disk space and located in the blockchain prior to the pruning point using a compression algorithm or applying deduplication techniques to the blocks of the blockchain stored in the local disk space and located in the blockchain prior to the pruning point.

3. The method according to claim 1, wherein the local copy of the blockchain is stored in a local disk space of a node of the blockchain network, and wherein the pruning the local copy of the blockchain comprises moving blocks of the blockchain stored in the local disk space and located in the blockchain prior to the pruning point out of the local disk space to external storage.

4. The method according to claim 1, further comprising using the pruned local copy of the blockchain for validating future transactions.

5. The method according to claim 1, wherein the pruning threshold parameter is stored in a core algorithm of the blockchain network and defines an amount of blocks to keep after the pruning and a minimum amount of blocks between pruning events.

6. The method according to claim 5, wherein a counter is used to track the amount of blocks created in the blockchain, the counter being reset after each of the pruning events.

7. The method according to claim 6, wherein the pruning events occur at regular intervals and each node of the blockchain network commits to a set of active blocks and active smart contracts used respectively to create the active blocks commitments Merkle tree and the active smart contracts commitments Merkle tree at each of the pruning events.

8. The method according to claim 1, further comprising storing the active blocks commitments Merkle tree and the active smart contracts commitments Merkle tree together with a Merkle tree for transactions in a body of the new genesis block.

9. The method according to claim 1, wherein the active blocks commitments Merkle tree and the active smart contracts commitments Merkle tree are created by a node of the blockchain network immediately upon reaching the threshold such that the new genesis block is broadcast to the blockchain by the node before another block, which was not broadcasted to the blockchain network prior to reaching the threshold, is able to be broadcast by another node of the blockchain network.

10. The method according to claim 1, further comprising using the new genesis block and an amount of blocks to keep after the pruning defined by the pruning threshold parameter as a new blockchain to be used for validating transactions, and thereafter appending new blocks having the validated transactions on the new genesis block in the new blockchain.

11. The method according to claim 1, wherein some or all nodes of the blockchain network perform the pruning, and wherein all of the nodes commit to a set of active blocks and active smart contracts used respectively to create the active blocks commitments Merkle tree and the active smart contracts commitments Merkle tree upon the blockchain network reaching consensus on the new genesis block.

12. A miner node of a blockchain network comprising one or more computational processors with a local disk space containing a copy of a blockchain of the blockchain network, the computational processors, alone or in combination, being configured to provide for execution of a method comprising:
creating an active blocks commitments Merkle tree from hashes of active blocks and creating an active smart contracts commitments Merkle tree from hashes of active smart contracts, the Merkle trees being created after an amount of blocks created in the blockchain has reached a threshold set by a pruning threshold parameter stored in the blockchain network;
storing hashes of the roots of the Merkle trees in a header of a new block as a new genesis block;
broadcasting the new genesis block to the blockchain network; and
pruning a local copy of the blockchain at a pruning point in accordance with the pruning threshold parameter based on the blockchain network having reached consensus on the new genesis block.

13. The miner node according to claim 12, wherein the pruning the local copy of the blockchain comprises compressing blocks of the blockchain stored in the local disk space and located in the blockchain prior to the pruning point using a compression algorithm or applying deduplication techniques to the blocks of the blockchain stored in the local disk space and located in the blockchain prior to the pruning point.

14. The miner node according to claim 12, being further configured to use the pruned local copy of the blockchain for validating future transactions.

15. A non-transitory, computer-readable medium having instructions thereon which, after implementation on one or more computational processors with a local disk space containing a copy of a blockchain of a blockchain network, the computational processors, alone or in combination, provide for execution of a method comprising:
creating an active blocks commitments Merkle tree from hashes of active blocks and creating an active smart contracts commitments Merkle tree from hashes of active smart contracts, the Merkle trees being created after an amount of blocks created in the blockchain has reached a threshold set by a pruning threshold parameter stored in the blockchain network;
storing hashes of the roots of the Merkle trees in a header of a new block as a new genesis block;
broadcasting the new genesis block to the blockchain network; and
pruning a local copy of the blockchain at a pruning point in accordance with the pruning threshold parameter based on the blockchain network having reached consensus on the new genesis block.

* * * * *